United States Patent
Kariya (10) Patent No.: US 7,854,191 B2
(45) Date of Patent: Dec. 21, 2010

(54) THREE-PIECE OIL RING AND COMBINATION OF THE THREE-PIECE OIL RING AND PISTON

(75) Inventor: Tomotaka Kariya, Saitama (JP)

(73) Assignee: Nippon Piston Ring Co., Ltd, Saitama-ken (JP)

( * ) Notice: Subject to any disclaimer, the term of this patent is extended or adjusted under 35 U.S.C. 154(b) by 371 days.

(21) Appl. No.: 12/161,620

(22) PCT Filed: Jan. 30, 2007

(86) PCT No.: PCT/JP2007/051484

§ 371 (c)(1),
(2), (4) Date: Jul. 21, 2008

(87) PCT Pub. No.: WO2007/088847

PCT Pub. Date: Aug. 9, 2007

(65) Prior Publication Data

US 2009/0013866 A1   Jan. 15, 2009

(30) Foreign Application Priority Data

Jan. 31, 2006   (JP) .............................. 2006-022546

(51) Int. Cl.
*F16J 9/00* (2006.01)
*F01B 31/10* (2006.01)
(52) U.S. Cl. .......................................... 92/253; 92/160
(58) Field of Classification Search ................. 92/160, 92/250, 253; 277/467, 468, 472–476, 478, 277/479

See application file for complete search history.

(56) References Cited

U.S. PATENT DOCUMENTS

| 6,205,908 B1 * | 3/2001 | Kumai et al. .................. 92/160 |
| 6,267,384 B1 * | 7/2001 | Watari ........................ 277/473 |
| 7,243,596 B2 * | 7/2007 | Usui et al. ................... 92/253 |

FOREIGN PATENT DOCUMENTS

| JP | 62-067261 A | 3/1987 |
| JP | 2000-018386 A | 1/2000 |
| JP | 2003-049705 A | 2/2003 |
| JP | 2005-069289 A | 3/2005 |

* cited by examiner

*Primary Examiner*—Michael Leslie
(74) *Attorney, Agent, or Firm*—Sughrue Mion, PLLC (57) ABSTRACT

A three-piece oil ring and a combination of the three-piece oil ring and a piston, those capable of realizing improved sealing property and reduction in lubrication oil consumption with avoiding generation of sticking even at low tension and thin width of the ring. The three-piece oil ring includes a spacer expander 10 and two side rails. The spacer expander has a radially inner end portion provided with seating tabs 13 protruding in an axial direction and having radially outer inclined surfaces for urging inner peripheral surfaces of the first and second side rails. The spacer expander has a radially outer end portion provided with side rail support portions 14 projecting in the axial direction for supporting axial end faces of the first and second side rails. A seating tab angle of the outer inclined surface relative to an axis is in a range of 10 to 20 degrees, and a ratio of 2X/Y is in a range of from 0.04 to 0.15 where 2X is a total projecting length of the side rail support portions in the axial direction, and Y is a distance between distal end faces of the seating tabs in the axial direction.

2 Claims, 8 Drawing Sheets

THREE-PIECE OIL RING AND COMBINATION OF THE THREE-PIECE OIL RING AND PISTON

TECHNICAL FIELD

The present invention relates to a three-piece oil ring and a combination of the three-piece oil ring and a piston.

BACKGROUND

In an internal combustion engine, two compression rings are fitted in piston ring grooves formed in an outer peripheral surface of a piston at a side of a combustion chamber, and one oil ring is fitted in a piston ring groove at a side opposite to the combustion chamber. An example of the oil ring is a so-called three-piece oil ring that includes a spacer expander and a pair of side rails. The spacer expander exerts a biasing force in the radially outward direction of the ring. The side rails are set at the axial ends of the spacer expander, respectively, and are biased by the space expander radially outwardly, or toward an inner peripheral surface of a cylinder.

In recent years, a demand has increased that fuel consumption should be reduced in the internal combustion engines for automobiles. The reduction in friction to piston rings has therefore been greatly required. To meet this demand, a thin axial width and low tension in the oil ring has been designed. Three-piece oil ring including a pair of side rails and a spacer expander is increasingly used in gasoline engines, because they help to reduce the oil consumption. The three-piece oil ring excels in sealability with respect to a piston ring groove, because the spacer expander pushes both side rails onto the inner peripheral surface of the cylinder. However, the reduction in friction decreases the tension (to 0.20 N/mm to 0.25 N/mm, i.e., a value obtained by dividing total tension of two compression rings and one oil ring by a bore diameter). Consequently, the sealing property of the three-piece oil ring becomes insufficient, inevitably increasing the oil consumption.

The spacer expander of the three-piece oil ring has seating tabs on the inner peripheral surface thereof. The seating tabs extend almost in the axial direction of the ring and push the inner peripheral surface of each side rail (see, for example, Patent Document 1: Japanese Patent Publication No. Sho-35-16503. Since the seating tabs extend parallel to the axis of the ring, the side rails cannot exert a sufficient side pressure on a radially extending wall surface of the piston ring groove. Inevitably, the side rails become floppy in the piston ring groove and may move in the axial direction of the piston. Further, oil may easily flow into the gap between the side rail and top surface of the piston ring groove. This causes an increase in oil consumption.

To solve this problem, seating tabs having so-called a predetermined seating tab angle has been proposed in which the seating tabs protrude in a direction inclined with respect to the axial direction of the ring. Thus inclined, the seating tabs urge the side rails radially outwardly and in a direction intersecting the radial direction. The seating tabs therefore urges the side rails to be in pressure contact with the radially extending wall of the piston ring groove, providing a side pressure on the radially extending wall of the piston ring groove and thus restraining mobility of the side rails. This can suppress the oil consumption. The spacer expander has side-rail supporting portions on the outer peripheral surface. The side-rail supporting portions protrude in the axial direction and support axial end face of the first and second side rails. The side-rail supporting portions hold the side rails at a specific fulcrum position when the side rails are assembled in the piston ring groove and so inclined as described above. (See, for example, Non-Patent Document 1: "Piston Rings for Use in Automobile, p. 33, FIG. 2.30." published by Sankaido Co. Ltd., Editors' Committee of Automobile Piston Rings, dated October 1997.

A piston is formed with a drain hole that opens to a bottom of the piston ring groove. Through the drain hole, oil that has flowed into the piston ring groove is circulated into a crankcase. A width of the piston ring groove in the axial direction becomes smaller in accordance with decrease in thickness of the three-piece oil ring. Hence, a volume of the space between the ring groove and either side rail becomes extremely small. In addition, because of the enhancement in the sealing property of the side rails, which has been achieved by the above-mentioned seating tab angle, sticking the side rails or the expander to a combustion residue accumulated in the piston ring groove may occur, causing phenomenon known as "sticking". This may degrade oil recirculation. Thus, improvement on sealing property of the side rails and the reduction in lubricant consumption are contradicting requirement to each other, particularly in the low-tension oil ring which has a small width in the axial direction.

SUMMARY OF THE INVENTION

It is therefore, an object of the present invention to provide a three-piece oil ring that has small width and low tension but can realize high sealing property and reduction in oil consumption without generation of sticking, and also to provide a combination of a piston and such a three-piece oil ring.

In order to attain the object, the present invention provides a three-piece oil ring including a spacer expander, a first side rail disposed at one axial end of the spacer expander, and a second side rail disposed at another axial end of the spacer expander. The spacer expander includes an annular body having a radially inner end portion provided with seating tabs protruding in an axial direction of the annular body from the one axial end face of the annular body and from another axial end face of the annular body and having radially outer surfaces inclined with respect to an axis of the annular body for urging inner peripheral surfaces of the first side rail and the second side rail, respectively. The annular body has a radially outer end portion provided with side rail support portions projecting in the axial direction from the one axial end face of the annular body and from the another axial end face of the annular body for supporting axial end faces of the first side rail and the second side rail, respectively. The inclined radially outer surface of each seating tab and the axis of the annular body define a seating tab angle ranging from 10 to 20 degrees, and a ratio of 2X/Y is in a range of from 0.04 to 0.15 where 2X is a total projecting length of the side rail support portions in the axial direction, and Y is a distance between distal end faces of the seating tabs in the axial direction.

With the structure of the three-piece oil ring having a low tension, generation of sticking can be prevented and lubrication oil consumption can be suppressed. Since the ratio of the total length 2X to the distance Y between distal end faces of the seating tabs as measured in the axial direction, i.e., 2X/Y, is 0.04 to 015, an oil passage can be provided in the piston ring groove even if the oil ring is thin in the axial direction. Through the oil passage, the oil accumulated in the oil ring groove can be easily guided in drain holes.

In another aspect of the invention, there is provided a combination of a piston formed with an annular piston ring groove and a three-piece oil ring to be assembled in the piston ring groove. The combination includes a piston formed with a plurality of drain holes in communication with the oil ring groove for circulating lubrication oil toward a crankcase. The piston has a thrust side and an anti-thrust side. A three-piece oil ring includes a spacer expander, a first side rail disposed at one axial end of the spacer expander, and a second side rail disposed at another axial end of the spacer expander. The spacer expander includes an annular body having a radially inner end portion provided with seating tabs protruding in an axial direction of the annular body from the one axial end face of the annular body and from another axial end face of the annular body and having radially outer surfaces inclined with respect to an axis of the annular body for urging inner peripheral surfaces of the first side rail and the second side rail, respectively. The annular body has a radially outer end portion provided with side rail support portions projecting in the axial direction from the one axial end face of the annular body and from the another axial end face of the annular body for supporting axial end faces of the first side rail and the second side rail, respectively. The inclined radially outer surface of each seating tab and the axis of the annular body define a seating tab angle ranging from 10 to 20 degrees, and a ratio of 2X/Y is in a range of from 0.04 to 0.15 where 2X is a total projecting length of the side rail support portions in the axial direction, and Y is a distance between distal end faces of the seating tabs in the axial direction. The drain holes open to the thrust side of the piston has a total number greater than that open to the anti-thrust side.

The unit including the three-piece oil ring and the piston, thus configured, has the advantage specified above. In addition, the oil can circulate from the thrust part of the piston into an internal space of the piston by virtue of piston slap, because the number of drain holes open to the thrust part of the piston is greater than that open to the anti-thrust part thereof. The piston slap is a phenomenon such that a resultant force of the combustion pressure and the reaction force from the connecting rod acts on the piston, thereby moving the piston to one lateral side of the cylinder, and thus generating vibration or making noise.)

EFFECT OF THE INVENTION

With this arrangement, sealability can be improved and lubrication oil consumption can be reduced to overcome the problem of stick generation even with the three-piece oil rings providing low tension and having thin thickness.

DESCRIPTION OF REFERENCE NUMERALS

1: cylinder
2: piston
5: three-piece oil rings
10, 110: spacer expander
11, 111: corrugated projection
12, 112: corrugated recess
13, 113; seating tab
14, 114: side rail support portion
20, 30: side rail
20a, 30a: inner peripheral surface of side rail
20b, 30b: axial end faces of side rail

BEST MODE FOR CARRYING OUT THE INVENTION

Figure 1:
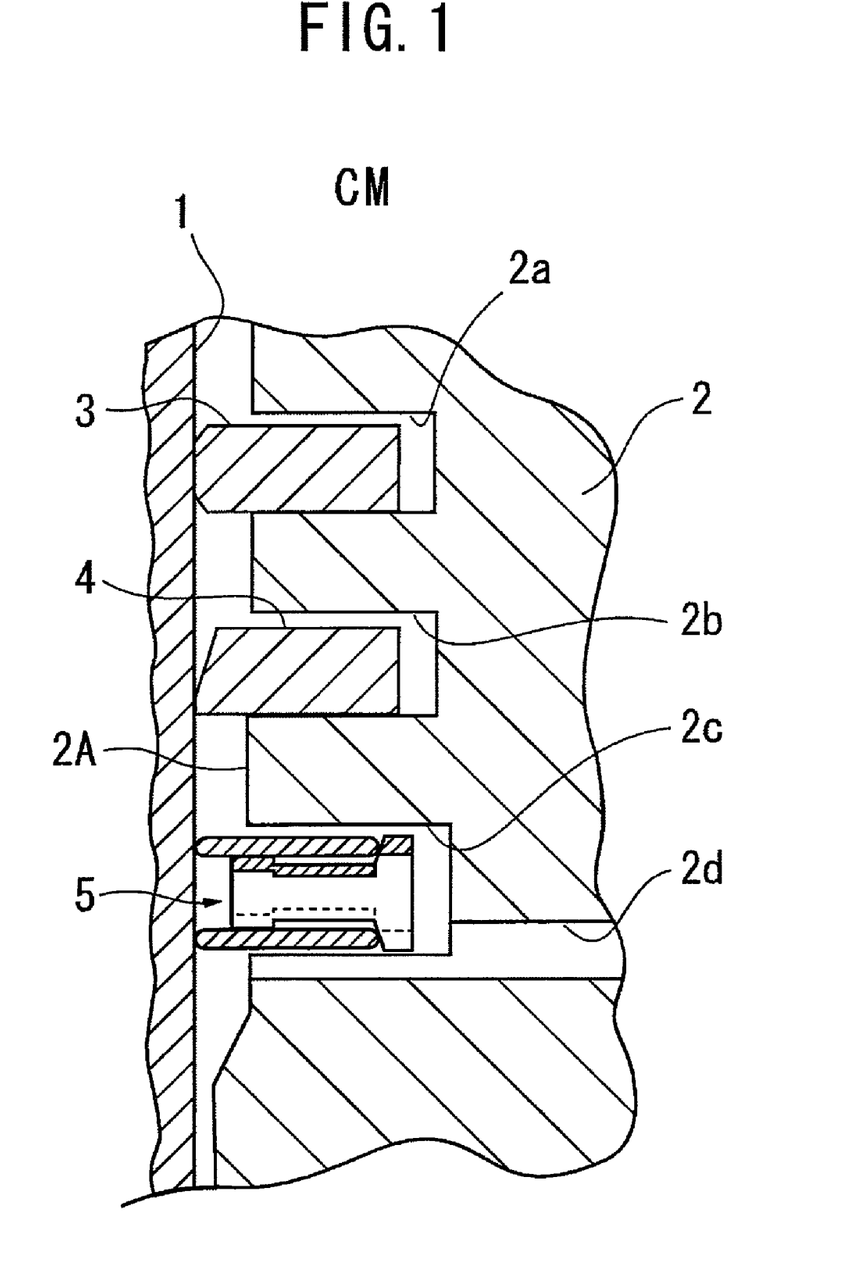
FIG. 1 is a cross-sectional view for description of a relationship between a piston and piston rings in a combination of three-piece oil rings and a piston according to a first embodiment of the present invention.

A three-piece oil ring and a combination of a piston and the three-piece oil ring according to one embodiment of the present invention will be described with reference to FIGS. 1 to 6. FIG. 1 is a schematic view of a cylinder and a piston assembled with a three-piece oil ring. The piston 2 that reciprocates in the cylinder 1 has annular ring grooves 2a, 2b and 2c. A first compression ring 3, a second compression ring 4, and a three-piece oil ring 5 are fitted in the ring grooves 2a, 2b and 2c, respectively, arranged in the order from a combustion chamber CM, and set in sliding contact with the inner peripheral surface of the cylinder 1. The three-piece oil ring 5 performs two functions. First, the ring 5 scrapes down lubrication oil in the cylinder 1. Second, the ring 5 serves as a check valve preventing oil from flowing to a piston land 2A located above the oil ring 5. The piston 2 has a drain hole 2d at the ring groove 2c in which the three-piece oil ring 5 is fitted. Lubrication oil can therefore circulate via the drain hole 2d to a crankcase (not shown). The crankcase is a space in which a crankshaft is provided and is defined by a skirt part of a cylinder block and an oil pan.

Figure 2:
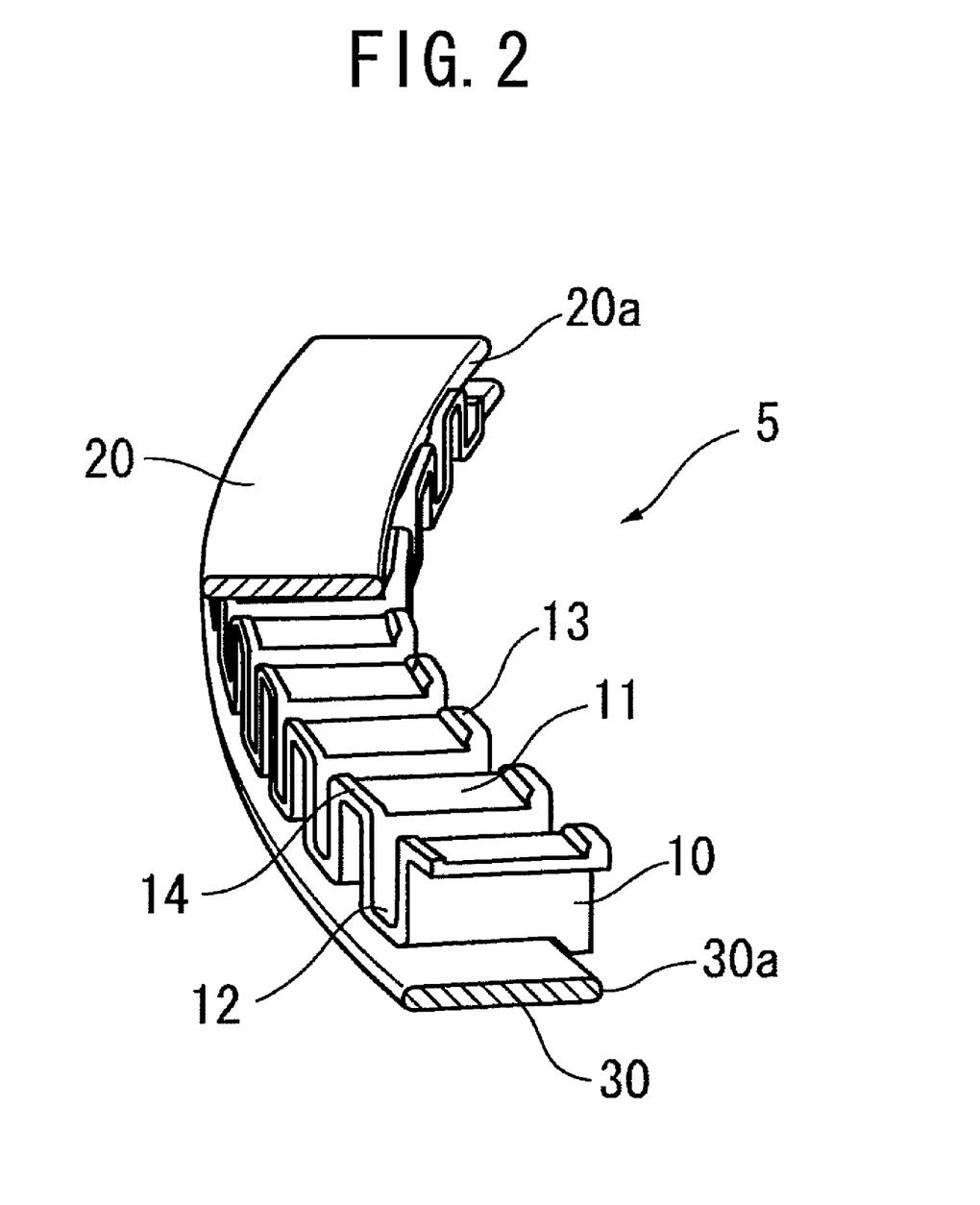
FIG. 2 is a partial perspective view of the three-piece oil rings in the combination of the three-piece oil rings and piston according to the first embodiment of the present invention.
Figure 3:
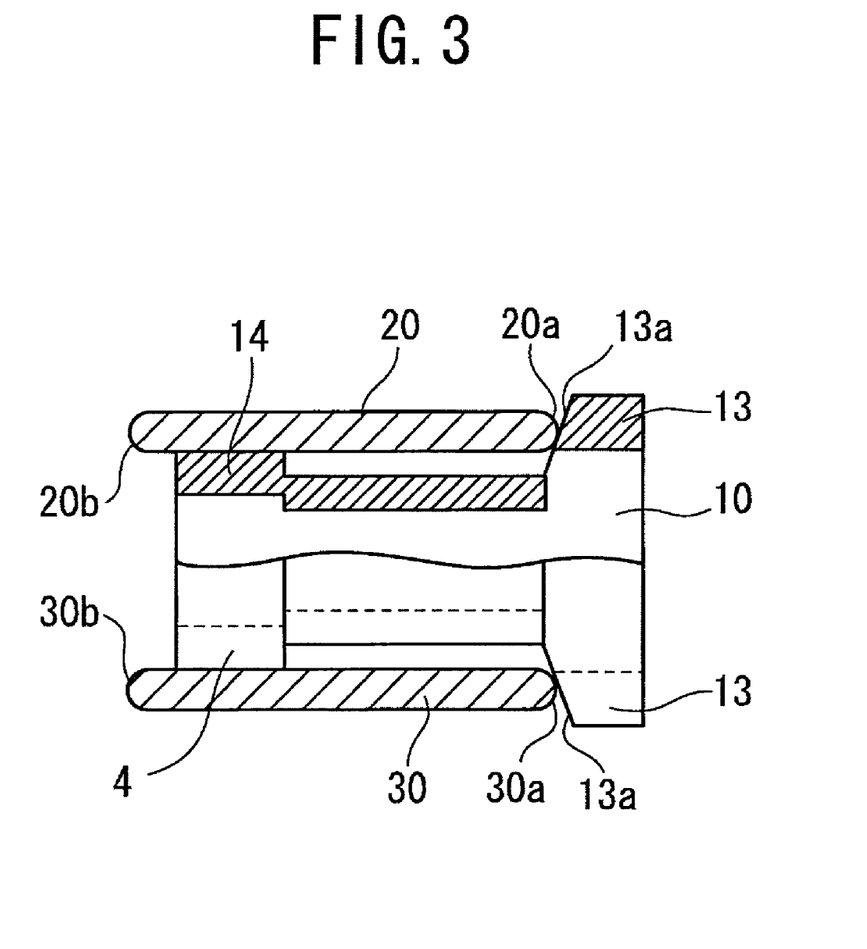
FIG. 3 is a cross-sectional view showing the three pieces oil rings in the combination of the three-piece oil rings and piston according to the first embodiment of the present invention.
Figure 4:
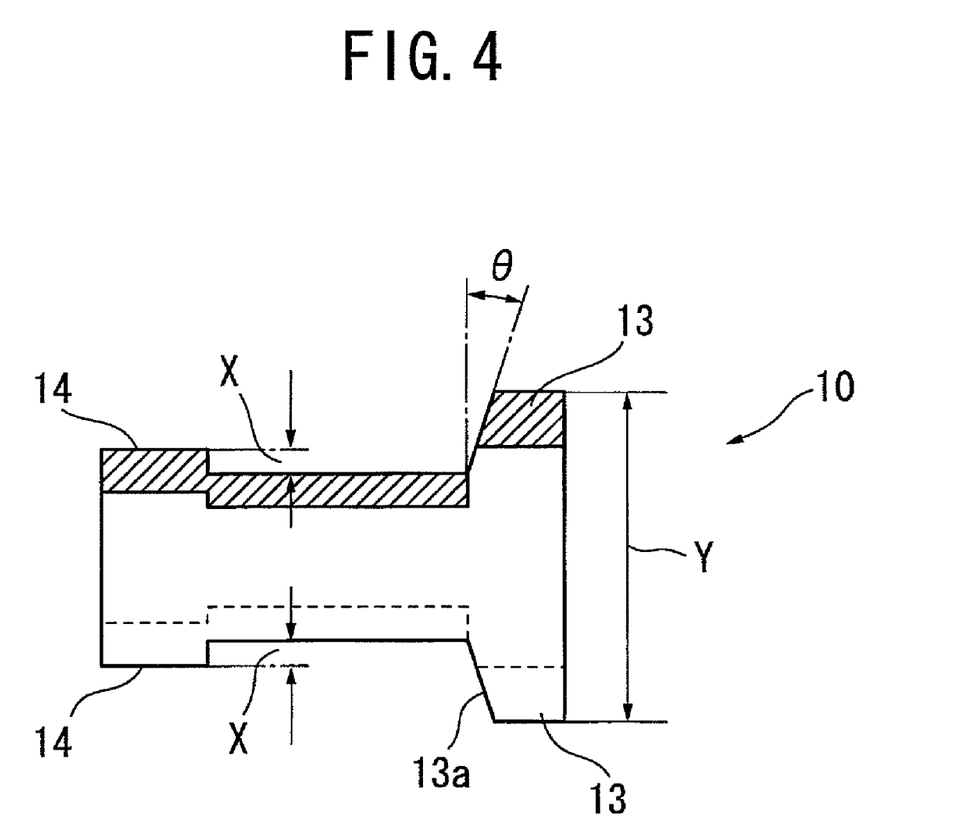
FIG. 4 is an enlarged cross-sectional view showing a spacer expander, which is one of components of the three-piece oil rings in the combination of the three-piece oil rings and piston according to the first embodiment of the pre-sent invention.

As shown in FIG. 2 to 4, the three-piece oil ring 5 includes an annular spacer expander 10, a first side rail 20 disposed at one axial end of the spacer expander 10, and a second side rail 30 disposed at another axial end of the spacer expander 10. The spacer expander 10 is corrugated in the axial direction, and includes corrugated projections 11 projecting in the axial direction and corrugated recesses 12 recessed in the axial direction, those being alternately arranged in a circumferential direction.

The spacer expander 10 has a radially inner side provided with seating tabs 13 protruding in the axial direction. The seating tabs 13 have an inclined surface 13a, 13a at a radially outer side thereof so as to push an inner peripheral surface 20a of the first side rail 20 and an inner peripheral surface 30a of the second side rail 30. The inclined surface 13a of each seating tab 13 is inclined at an inclination angle (seating tab angle) θ ranging from 10° to 20®with respect to an axis. If the seating tab angle θ is less than 10°, the seating tab 13 cannot exert a minimum side pressure with which the side rails 20 and 30 pushes against a radially extending wall of the ring groove 2c. The oil may readily flow from the oil ring groove 2c into the gap between the side rail 20 and the radially extending wall of the ring groove 2c, increasing the amount of oil supplied to the upper piston land 2A due to pumping and ultimately increasing oil consumption. On the other hand, if the seating tab angle θ exceeds 200, excessive the side pressure may exert on the radially extending wall, possibly resulting in a generation of sticking. Note that an optimal result can be attained, in view of the reduction in the oil consumption and the prevention of sticking, if the seating tab angle θ falls within the range of 15° to 20°.

The spacer expander 10 has a radially outer end portion provided with side-rail supporting portions 14 projecting axially for supporting axial end faces 20b and 30b of the first and second side rails 20 and 30. The side-rail supporting portions 14 are adapted for fixing fulcrum positions at the end faces 20b and 30b as long as the side rails 20 and 30 remain supported and inclined in the oil ring groove 2c. A ratio of the total distance 2X to a distance Y, i.e., (2X/Y) is set to 0.04 to 0.15, where as shown in FIG. 4, X is a projecting length of each side-rail supporting portion 14 extending in the axial direction of the piston 2, and Y is a distance (or an entire width) between distal ends of seating tabs 13 as measured in the axial direction. If the radio 2X/Y exceeds 0.15, the spacer expander 10 will be excessively thin, as measured in the axial direction, and may be broken at a base end of each seating tab 13. If the radio 2X/Y is less than 0.04, a volumetric space defined by a sidewall supporting portion 14, the seating tab 13 and the side rail 20 will be too small to avoid sticking. Note that if the ratio 2X/Y falls in the rage of 0.09 to 0.15, an optimal result can be attained in view of the prevention of seating tab breakage and the prevention of sticking.

Figure 5:
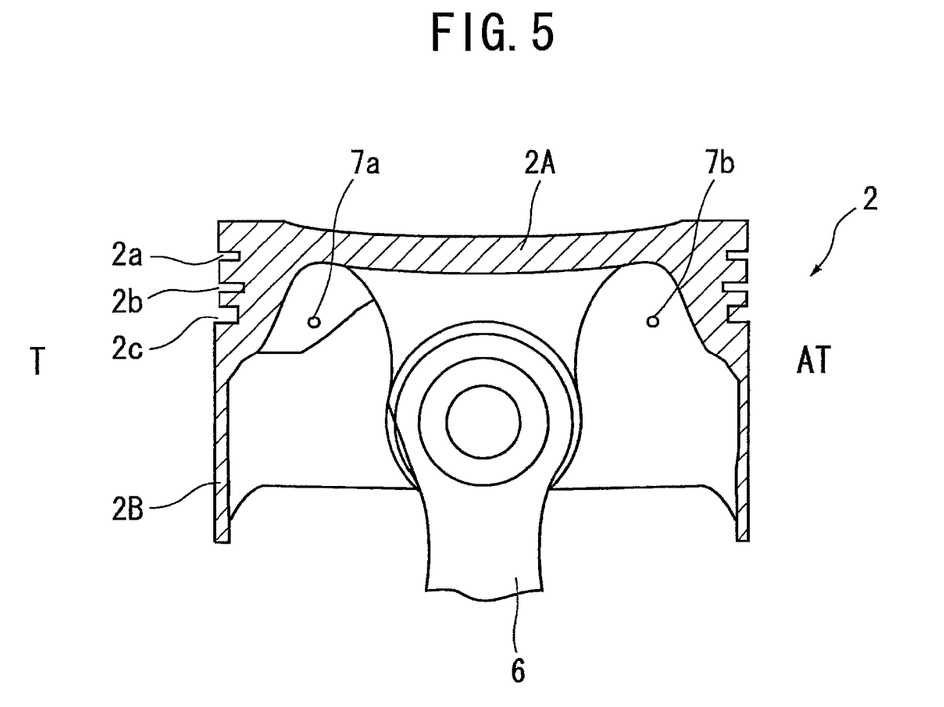
FIG. 5 is a cross-sectional view showing the piston in the combination of the three-piece oil rings and piston according to the first embodiment of the present invention.
Figure 6:
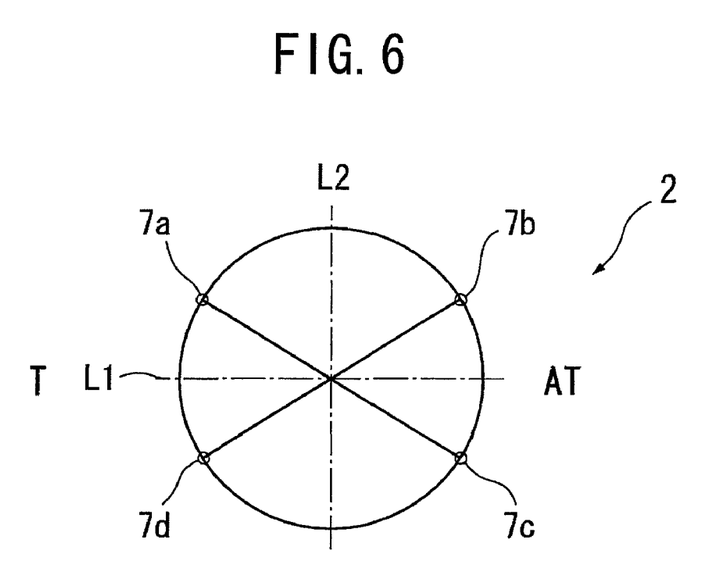
FIG. 6 is a view for description of opening position of a drain hole at an inner peripheral surface of a piston wall portion in the combination of the three-piece oil rings and piston according to the first embodiment of the present invention.

As shown in FIG. 5, the piston 2 has a crown 2A defining a combustion chamber, and a circumferential wall 2B facing the inner peripheral surface of the cylinder and formed with the above-mentioned ring grooves 2a, 2b and 2c. A hollow space is defined inside the circumferential wall 3B where a connecting rod 6 is pivotally movably coupled to the piston 2. As shown in FIGS. 5 and 6, four drain holes are formed in the bottom of the oil ring groove 2c, and have their openings 7a to 7d arranged symmetrically at a thrust part T and an anti-thrust part AT of the piston 2.

More precisely, the openings 7a and 7d at the thrust part T are symmetrical with respect to line L1 that extends in the diametrical direction and is located at the thrust center, and the openings 7b and 7c at the anti-thrust part AT are symmetrical with respect to the line L1. Further, regarding line L2 that divides the piston 2 into the thrust part T and anti-thrust part AT, the opening 7a at the thrust part T and the opening 7b at the anti-thrust part TA are symmetrical with respect to the line L2, and the opening 7d at the thrust part T and the opening 7c at the anti-thrust part TA are symmetrical with respect to the line L2. The symmetrical arrangement of these openings 7a to 7d can facilitate manufacture of the piston 2. Incidentally, FIG. 6 shows the opening positions where the drain holes open to an inner peripheral surface of the circumferential wall 2B of the piston 2. The above-described three-piece oil ring according to the first embodiment of the present invention in combination with the piston 2 having the above-described drain holes shown in FIGS. 5 and 6 will exhibit sufficient technical effect and function.

Figure 7:
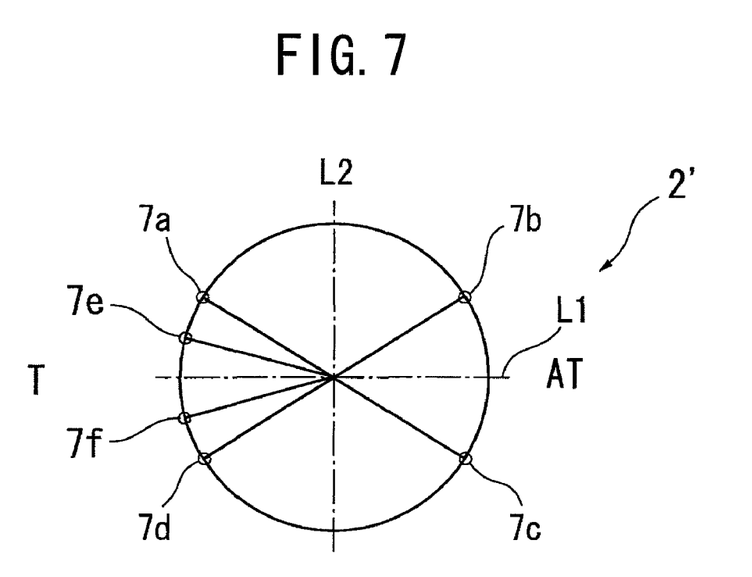
FIG. 7 is a view for description of opening position of a drain hole at an inner peripheral surface of a piston wall portion in a combination of three-piece oil rings and piston according to a second embodiment of the present invention.

A three-piece oil ring according to a second embodiment of the invention and a combination of the three-piece oil ring and a piston according to the second embodiment will be described with reference to FIG. 7. The three-piece oil ring is identical to the ring of the first embodiment, and will not be described. As shown in FIG. 7, a piston 2' according to the second embodiment has additional drain holes 7e and 7f at the thrust part T of the piston 2'. These drain holes 7e and 7f are symmetrical with respect to the line L1. Thus, more drain holes are formed at the thrust part T than at the anti-thrust part AT. Since the number of the drain hole at the thrust part T is greater than that at the anti-thrust part AT, oil circulating function for directing the lubrication oil in radially inward direction, i.e., toward the internal hollow space of the piston 2' can be enhanced because of piston-slap effect.

Experimental tests were conducted on the unit including the three-piece oil ring according to the embodiment described above and a piston for investigating generation of sticking and oil consumption. In the experiment, the unit was used in an automobile gasoline engine having displacement of 1.6 liters and four cylinders in-line. The engine was driven for 300 hours, while changing the cooling-water temperature from 30 to 100° C. by means of a 6000 rpm-WOT (wide-open throttle). After 300-hours cold-hot driving test, the engine was examined for oil consumption and presence or absence of sticking. The results are shown in Tables 1 and 2. The testing conditions were as follows:

Piston bore-diameter: 81 mm

Total tension ratio: 0.23 N/mm

First compression ring

Thickness a1 (in radial direction): 2.7 mm

Width h1 (in axial direction): 1.2 mm

Shape of sliding surface: Barrel face

Second compression ring

Thickness a1 (in radial direction): 2.9 mm

Width h1 (in axial direction): 1.2 mm

Shape of sliding surface: Taper under-cut

Oil Ring

Thickness a1 (in radial direction): 2.5 mm

Width h1 (in axial direction): 2.0 mm

Total width Y of spacer expander (FIG. 4): 1.75 mm

The term "total tension ratio" is a value obtained by dividing the total tension of the piston rings (i.e., compression rings and oil ring) by the piston bore-diameter.

Various spacer expanders were prepared, which differ in seating tab angle of the seating tab 13 and length X (FIG. 4) as shown in Tables 1 and 2. Table 1 pertains to the piston having two drain holes at the thrust part and two drain holes at the anti-thrust part as illustrated in FIG. 6. The openings of the drain holes 7a to 7d are symmetrical with respect to the line L1 and angularly spaced from the line L1 by 30°. Table 2 pertains to the piston having two additional drain holes at the thrust part as shown in FIG. 7. Positions of the drain holes 7a to 7d were the same as the positions of the drawn holes as specified in Table 1, and the drain holes 7e and 7f are symmetrical to the line L1 and angularly spaced from the line L1 by 15°.

TABLE 1

| | | \multicolumn{10}{c}{Length X (mm) projecting length in axial direction of the spacer expander} |
|---|---|---|---|---|---|---|---|---|---|---|---|
| | | \multicolumn{2}{c}{0} | \multicolumn{2}{c}{0.03} | \multicolumn{2}{c}{0.04} | \multicolumn{2}{c}{0.08} | \multicolumn{2}{c}{0.13} |
| | | Sticking | LOC | Sticking | LOC | Sticking | LOC | Sticking | LOC | Sticking | LOC |
| seating tab angle (°) | 5 | x | x | △ | x | ○ | x | ○ | x | ○ | x |
| | 10 | x | x | △ | x | ○ | △ | ○ | △ | ○ | △ |
| | 15 | x | x | △ | x | ○ | ○ | ○ | ○ | ○ | ○ |
| | 20 | x | x | x | x | ○ | ○ | ○ | ○ | ○ | ○ |
| | 25 | x | x | x | x | x | x | x | x | x | x |

TABLE 2

| | | \multicolumn{10}{c}{Length X (mm) Projecting length in axial direction of the spacer expander} |
|---|---|---|---|---|---|---|---|---|---|---|---|
| | | \multicolumn{2}{c}{0} | \multicolumn{2}{c}{0.03} | \multicolumn{2}{c}{0.04} | \multicolumn{2}{c}{0.08} | \multicolumn{2}{c}{0.13} |
| | | Sticking | LOC | Sticking | LOC | Sticking | LOC | Sticking | LOC | Sticking | LOC |
| seating tab angle (°) | 5 | x | x | △ | △ | ○ | △ | ○ | △ | ○ | △ |
| | 10 | x | x | △ | △ | ⊚ | ○ | ⊚ | ○ | ⊚ | ○ |
| | 15 | x | x | △ | △ | ⊚ | ⊚ | ⊚ | ⊚ | ⊚ | ⊚ |
| | 20 | x | x | x | △ | ⊚ | ⊚ | ⊚ | ⊚ | ⊚ | ⊚ |
| | 25 | x | x | x | △ | △ | △ | △ | △ | △ | △ |

Table 1 and Table 2 show the presence or absence of sticking and the oil consumption. In these tables, with respect to sticking evaluation, mark ⊚ indicates the absence of sticking in all four cylinders, mark ○ indicates that no sticking is observed in four cylinders but at least one cylinder is sluggish (not falling by own weight thereof, but moved when lightly pushed with a finger), mark △ indicates the presence of sticking in at least one cylinder, and mark x indicates the presence of sticking in all cylinders. In Tables 1 and 2, LOC represents oil consumption, and LOC value 1 is the value when the seating tab angle is 20 degrees and the length X is 0.03 mm. Mark ⊚ indicates LOC of less than 0.7, mark ○ indicates LOC of from 0.7 to less than 0.9, mark △ indicates LOC of from 0.9 to less than 1.0, and mark x indicates LOC of 1.0 or more.

As evident from Table 1, the oil consumption is reduced and the sticking is prevented when the spacer expander has an seating tab angle of 10° to 20° and the ratio 2X/Y (i.e., ratio of the total length 2X to the distance Y) falls within the range of 0.04 to 0.15. Moreover, as clearly understood from Table 2, the oil consumption is further reduced and the sticking is more reliably prevented since the number of drain holes at the thrust part is greater than that at the anti-thrust part.

Figure 8:
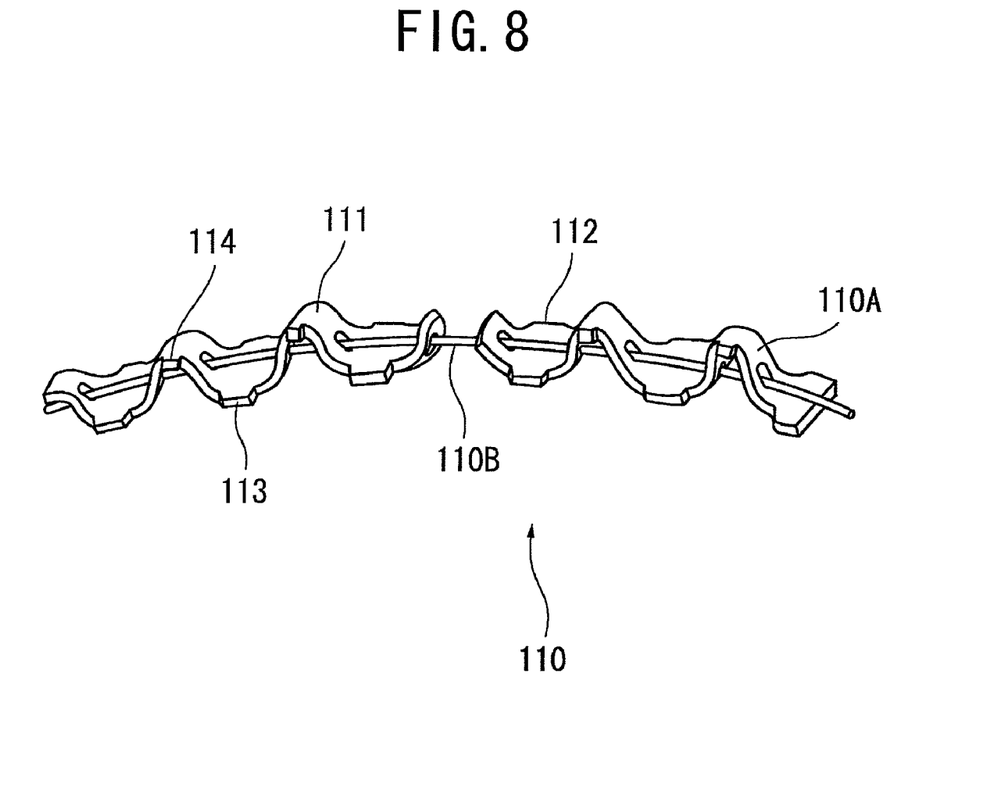
FIG. 8 is a partial perspective view showing a radial corrugation type spacer expander in a combination of three-piece oil rings and piston according to a modified embodiment of the present invention.
Figure 9:
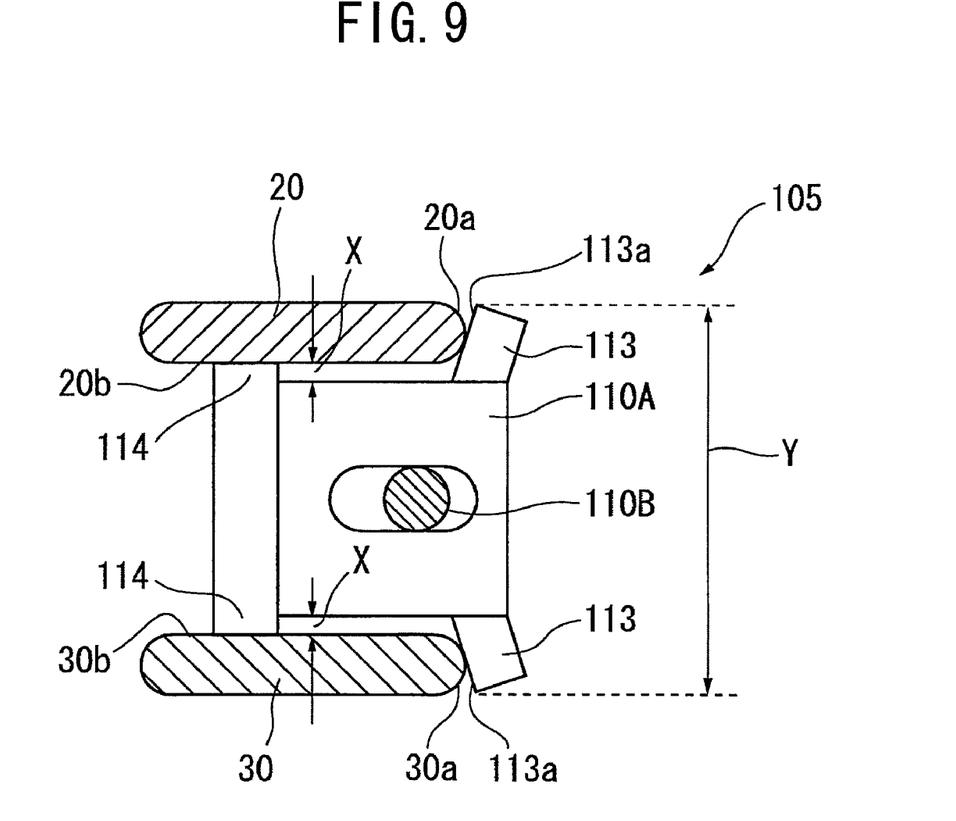
FIG. 9 is a cross-sectional view showing the three-piece oil rings according to the modified embodiment shown in FIG. 8.

FIGS. 8 and 9 show a three-piece oil ring according to a modified embodiment of the present invention. This three-piece oil ring has a spacer expander 110 in place of the spacer expander 10 that is corrugated in the axial direction as described above. The spacer expander 110 includes a band-shaped member 110A and a wire 110B. The band-shaped member 110A has corrugated projections 111 protruding radially outwardly and corrugated recesses 112 recessed radially inwardly, and those being alternately arranged in the circumferential direction. The wire 110B extends through holes formed in the band-shaped members 110A. The band-shaped member 110A has a radially inner end portion provided with seating tabs 113 extending in the axial direction and in opposite directions for pushing inner peripheral surfaces 20a and 30a of the first and second side rails 20 and 30, respectively. Each seating tabs 113 has a radially outer surface 113a inclined with respect to the axial direction. The seating tab angle θ defined between the inclining surface 113a and the central axis is in a range of from 10° to 20° similar to the first embodiment. Each band-shaped member 110A has a radially outer end portion provided with side-rail supporting portions 114 extending in the axial direction and in opposite directions. The side-rail supporting portions 114 have trapezoid shape, and are adapted for supporting axial end faces 20b and 30b of the first and second side rails 20 and 30, respectively. As long as the side rails 20 and 30 remain supported in the oil ring groove 2c and in inclined posture, the side-rail supporting parts 114 serves to fix a fulcrum point with respect to the axial end faces 20b, 30b. The ratio of the total length 2X to the distance Y, i.e., 2X/Y, is set to 0.04 to 0.15 as in the first embodiment, where X is the projecting length of each side-rail supporting part 114 extending in the axial direction of the piston 2, and Y is a distance between distal end faces of the seating tabs 13 as measured in the axial direction.

While the invention has been described in detail with reference to the embodiments thereof, it would be apparent to those skilled in the art that various changes and modifications may be made therein without departing from the spirit of the invention.

INDUSTRIAL APPLICABILITY

The three-piece oil rings and a combination of the three-piece oil rings and the piston are particularly available for a compact size internal combustion engine.

The invention claimed is:
1. A three-piece oil ring comprising:
 a spacer expander, a first side rail disposed at one axial end of the spacer expander, and a second side rail disposed at another axial end of the spacer expander, the spacer expander including an annular body having a radially inner end portion provided with seating tabs protruding in an axial direction of the annular body from one axial end face of the annular body and from another axial end face of the annular body and having radially outer surfaces inclined with respect to an axis of the annular body for urging inner peripheral surfaces of the first side rail and the second side rail, respectively, the annular body having a radially outer end portion provided with side rail support portions projecting in the axial direction from the one axial end face of the annular body and from the another axial end face of the annular body for supporting axial end faces of the first side rail and the second side rail, respectively, wherein the inclined radially outer surface of each seating tab and the axis of the annular body define a seating tab angle ranging from 10 to 20 degrees, and a ratio of 2X/Y is in a range of from 0.04 to 0.15 where 2X is a total projecting length of the side rail support portions in the axial direction, and Y is a distance between distal end faces of the seating tabs in the axial direction.

2. A combination of a piston formed with an annular piston ring groove and a three-piece oil ring to be assembled in the piston ring groove, comprising:

a piston formed with a plurality of drain holes in communication with the oil ring groove for circulating lubrication oil toward a crankcase, the piston having a thrust side and an anti-thrust side; and a three-piece oil ring comprising:

a spacer expander, a first side rail disposed at one axial end of the spacer expander, and a second side rail disposed at another axial end of the spacer expander, the spacer expander including an annular body having a radially inner end portion provided with seating tabs protruding in an axial direction of the annular body from one axial end face of the annular body and from another axial end face of the annular body and having radially outer surfaces inclined with respect to an axis of the annular body for urging inner peripheral surfaces of the first side rail and the second side rail, respectively, the annular body having a radially outer end portion provided with side rail support portions projecting in the axial direction from the one axial end face of the annular body and from the another axial end face of the annular body for supporting axial end faces of the first side rail and the second side rail, respectively, wherein the inclined radially outer surface of each seating tab and the axis of the annular body define a seating tab angle ranging from 10 to 20 degrees, and a ratio of 2X/Y is in a range of from 0.04 to 0.15 where 2X is a total projecting length of the side rail support portions in the axial direction, and Y is a distance between distal end faces of the seating tabs in the axial direction;

wherein the drain holes open to the thrust side of the piston has a total number greater than that open to the anti-thrust side.

* * * * *